United States Patent
Neal

(10) Patent No.: US 12,434,430 B2
(45) Date of Patent: Oct. 7, 2025

(54) STEREOLITHOGRAPHY WITH DUAL AND PARALLEL BUILD PLANES

(71) Applicant: 3D Systems, Inc., Rock Hill, SC (US)

(72) Inventor: Travis Neal, Lancaster, SC (US)

(73) Assignee: 3D SYSTEMS, INC., Rock Hill, SC (US)

( * ) Notice: Subject to any disclaimer, the term of this patent is extended or adjusted under 35 U.S.C. 154(b) by 93 days.

(21) Appl. No.: 18/605,231

(22) Filed: Mar. 14, 2024

(65) Prior Publication Data

US 2024/0316857 A1     Sep. 26, 2024

Related U.S. Application Data

(60) Provisional application No. 63/492,035, filed on Mar. 24, 2023.

(51) Int. Cl.
*B29C 64/124* (2017.01)
*B22F 12/33* (2021.01)
*B33Y 30/00* (2015.01)

(52) U.S. Cl.
CPC ............ *B29C 64/124* (2017.08); *B22F 12/33* (2021.01); *B33Y 30/00* (2014.12)

(58) Field of Classification Search
None
See application file for complete search history.

(56) References Cited

U.S. PATENT DOCUMENTS

| | | | |
|---|---|---|---|
| 5,143,663 A * | 9/1992 | Leyden | B33Y 40/20 34/189 |
| 5,447,822 A | 9/1995 | Hull et al. | |
| 7,833,000 B2 | 11/2010 | Kihara et al. | |
| 8,666,142 B2 | 3/2014 | Shkolnik et al. | |
| 11,225,017 B2 | 1/2022 | Nishio et al. | |
| 2016/0082655 A1 | 3/2016 | Castanon et al. | |
| 2017/0225393 A1 | 8/2017 | Shkolnik | |
| 2020/0376748 A1* | 12/2020 | Brent, Jr. | D21F 1/009 |

FOREIGN PATENT DOCUMENTS

DE        102021103511 A1    8/2022
WO         2021211586 A1    10/2021

OTHER PUBLICATIONS

PCT International Search Report for International Search Authority for PCT/US2024/019943, mailed May 22, 2024 (5 pages).
PCT Written Opinion for International Search Authority for PCT/US2024/019943, mailed May 22, 2024 (9 pages).

* cited by examiner

*Primary Examiner* — Yung-Sheng M Tsui

(57) ABSTRACT

A three-dimensional (3D) printing system includes a build vessel, a build plate, a vertical movement mechanism, a lower light engine, an upper light engine, and a controller. The build vessel is configured to contain a column of photocurable liquid above a transparent sheet. The vertical movement mechanism is configured to vertically position the build plate. The controller is configured to operate the vertical movement mechanism, the lower light engine, and the upper light engine to fabricate: (a) a lower 3D article upon a lower surface of the build platform by selective solidification of the photocurable liquid at the lower build plane using the lower light engine, and (b) an upper 3D article upon an upper surface of the build platform by selective solidification of the photocurable liquid at the upper build plane using the upper light engine.

20 Claims, 3 Drawing Sheets

STEREOLITHOGRAPHY WITH DUAL AND PARALLEL BUILD PLANES

CROSS-REFERENCE TO RELATED APPLICATIONS

This non-provisional patent application claims priority to U.S. Provisional Application Ser. No. 63/492,035, Entitled "Stereolithography with Dual and Parallel Build Planes" by Travis Neal, filed on Mar. 24, 2023, incorporated herein by reference under the benefit of U.S.C. 119(e).

FIELD OF THE INVENTION

The present disclosure concerns an apparatus and method for manufacturing three-dimensional (3D) articles from photocurable liquids in a layer-by-layer manner. More particularly, the present disclosure concerns fast and efficient way of fabricating two articles using a minimal amount of the photocurable liquid.

BACKGROUND

Three dimensional (3D) printers are in rapidly increasing use for manufacturing customized 3D articles. One class of 3D printers includes stereolithography printers having a general principle of operation including the selective curing and hardening of radiation curable (i.e., photocurable) liquids. The 3D articles are formed in a layer-by-layer manner. There is a desire to find more efficient ways of fabricating "low profile" articles such as dental retainers and electrical connector housings.

SUMMARY

In a first aspect of the disclosure, a three-dimensional (3D) printing system includes a build vessel, a build platform, a vertical movement mechanism, a lower light engine, an upper light engine, and a controller. The build vessel includes a transparent sheet. The build vessel is configured to contain a column of photocurable liquid having a lower bound upon the transparent sheet and an upper bound at an interface with a gaseous atmosphere above the column of photocurable liquid. The build platform includes a build plate having an upper surface and a lower surface. The vertical movement mechanism is configured to vertically position the upper and lower surfaces of the build plate. The lower light engine is configured to define a lower build plane above the transparent sheet. The upper light engine is configured to define an upper build plane at the upper bound of the column of photocurable liquid. The controller is configured to operate the vertical movement mechanism, the lower light engine, and the upper light engine to fabricate: (a) a lower 3D article upon the lower surface of the build platform by selective solidification of the photocurable liquid at the lower build plane, and (b) an upper 3D article upon the upper surface of the build platform by selective solidification of the photocurable liquid at the upper build plane.

In one implementation, the upper build plane is a vertical distance H above the lower build plane. H is less than 150 millimeters (mm), or less than 130 mm, or within a range of 10 and 130 mm.

In another implementation, a vertical distance between the upper and lower build planes is H. The build plate has a thickness t. The lower 3D article has a height of $h_L$. The upper 3D article has a height $h_U$. H can have a magnitude that is between 1.0 and 2.0 times a sum of $t+h_L+h_U$. H can have a magnitude that is between 1.0 and 1.5 times a sum of $t+h_L+h_U$.

In a further implementation, the controller is configured to operate the vertical movement mechanism to position a lower face of the build plate or 3D article at the lower build plane, operate the lower light engine to selectively solidify the photocurable resin at the lower build plane and onto the lower face, operate the vertical movement mechanism to position an upper face of the build plate or 3D article within one layer thickness of an upper build plane, and operate the lower light engine to selectively solidify the photocurable resin at the upper build plane and onto the upper face. Operation of the vertical movement mechanism, the lower light engine, and the upper light engine are repeated until fabrication of the upper and lower 3D articles is complete.

In a yet further implementation, the 3D article is formed by a selective curing and solidification of layers of photocurable liquid or resin. The layer thickness is typically less than 0.2 millimeter (mm). In various implementations the layer thickness can be in a range of 0.05 mm to 0.2 mm, or 0.1 to 0.2 mm or about 0.1 mm.

In a second aspect of the disclosure, a method of manufacturing includes the following steps: (A) Provide a build vessel including a transparent sheet at a lower side. (B) Fill the build vessel with a column of photocurable liquid having a lower bound at the transparent sheet and an upper bound at a liquid to air interface. (C) Reciprocally translate a build plate between two vertical positions (1) and (2) within the photocurable liquid including: (1) A lower position at which a lower face of the build plate or 3D article is positioned at a lower build plane within one millimeter of the transparent sheet. (2) An upper position at which an upper face of the build plate or 3D article is positioned at an upper build plane at the upper bound of the column. Movement of the reciprocal translations monotonically decreases as the lower 3D article and the upper 3D article are being fabricated. (C) Operate a lower light engine to selectively cure a layer of the photocurable resin at the lower build plane when the lower face is at the lower build plane. (D) Operate an upper light engine to selectively cure a layer of photocurable resin at the upper build plane when the upper face is at the upper build plane.

In one implementation, the column of photocurable liquid has a vertical height of less than 130 millimeters (mm) or less than 100 mm or is within a range of 20 to 100 mm.

In another implementation, operating the lower light engine includes (1) illuminating an array of mirrors with a radiation source, (2) operating individual mirrors of the array of mirrors to selectively deflect an array of beams into projection optics, and (3) focusing array of light beams onto the lower build plane.

In a further implementation, operating the upper light engine includes (1) operating a laser to generate a radiation beam, (2) operating scanning optics to scan the radiation beam along two axes, and (3) focusing the radiation beam onto the upper build plane.

DETAILED DESCRIPTION OF THE PREFERRED EMBODIMENTS

Figure 1:
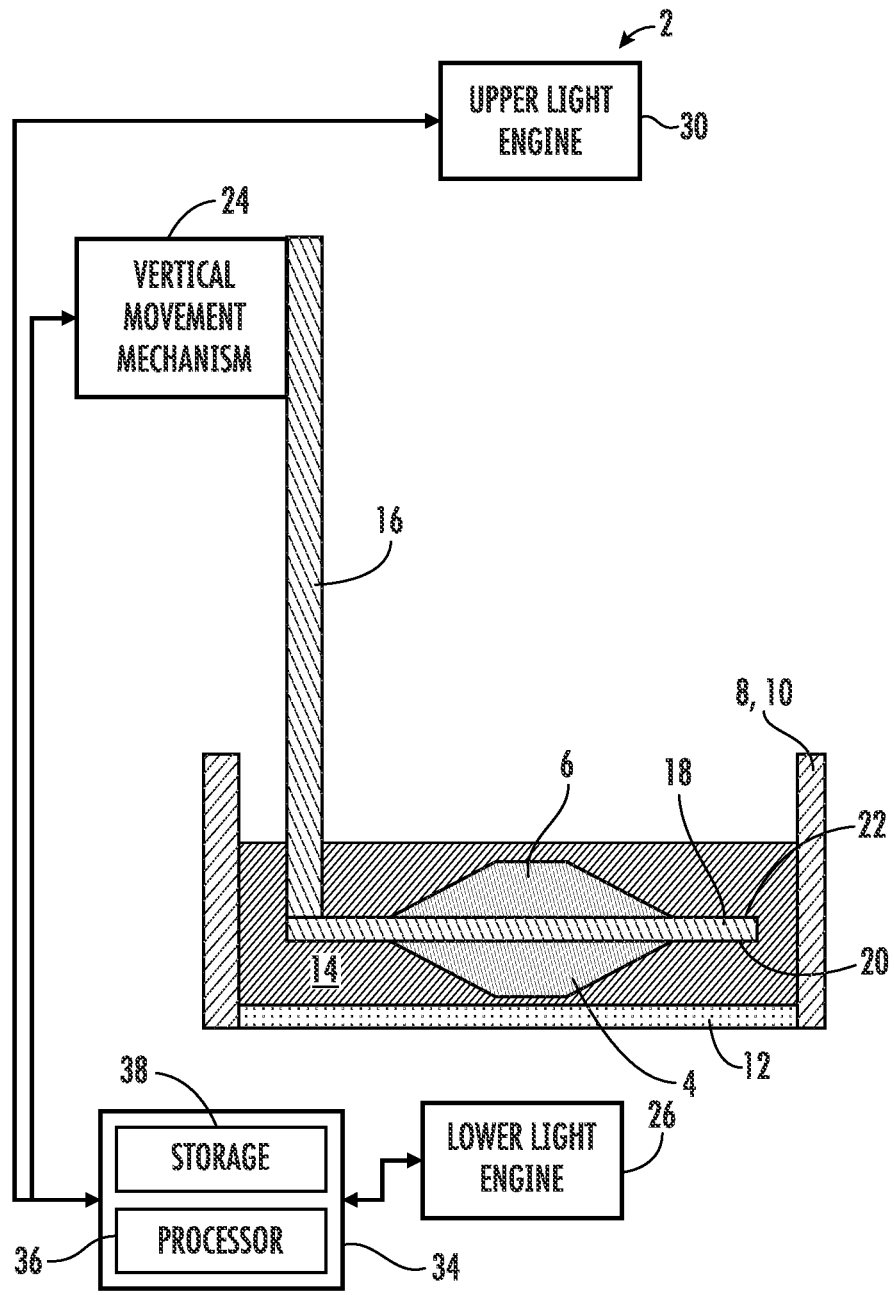
FIG. 1 is a schematic diagram of an embodiment of a three-dimensional (3D) printing system.

FIG. 1 is a schematic diagram of a three-dimensional (3D) printing system 2 configured to manufacture or fabricate 3D articles including a lower 3D article 4 and an upper 3D article 6. In describing the 3D printing system mutually perpendicular axes X, Y, Z can be used. The X and Y axes are lateral axes that are generally horizontal. The Z axis is a vertical axis that is generally aligned with a gravitational reference. In using the word "generally" it is implied that a quantity or property is by design but may not be exact.

3D printing system 2 includes a build vessel 8 having one or more lateral walls 10 and a transparent sheet 12. In an illustrative embodiment, the transparent sheet 12 is "semi-permeable" in that it is transmissive of an inhibitor such as oxygen. The transparent sheet is "transparent" in the sense that it is transparent to radiation in blue to ultraviolet wavelengths or about 500 nm (nanometers) to 100 nm. One example of a suitable transparent sheet is a fluoropolymer with optical clarity and gas permeability such as Teflon™ AF 2400. Other polymeric sheet materials can be suitable for the particular application.

The build vessel 8 is configured to contain a column of photocurable liquid 14. The photocurable liquid 14 can be a photocurable resin which can include various components including a monomer and photoinitiator or catalyst. Exposure to radiation with a suitable wavelength in the blue to ultraviolet wavelength will cause the photoinitiator or catalyst to initiate polymerization and/or cross-linking of the monomer to form a solid.

3D printing system 2 includes a build platform 16 including a build plate 18. The build plate 18 has a lower surface 20 for supporting the lower 3D article 4 and an upper surface 22 for supporting the upper 3D article 6. The build platform 16 is coupled to a vertical movement mechanism 24.

In an illustrative embodiment, the vertical movement mechanism 24 includes a motorized lead screw. A threaded nut is affixed to the build platform 16. The lead screw is coupled to a fixed motor and extends vertically through the threaded nut. External threads of the lead screw engage the threads of the threaded nut. As the motor rotates the lead screw the effect is to translate the threaded nut (and hence the build platform) vertically. Motorized lead screws for translating components are known in the art for printing systems.

Other vertical movement mechanisms can also be used for element 24 such as a rack and pinion system (motorized round pinion gear engages linear array of gear teeth along build platform 16), a motorized ball bearing screw mechanism (with the ball nut attached to the build platform), and motorized belt/pulley mechanisms. All of these are known in the art for movement mechanisms that can provide translation along various axes.

3D printing system 2 includes a lower light engine 26 for selectively curing layers of photocurable liquid 14 onto the lower 3D article 4. In an illustrative embodiment, the lower light engine 26 includes a light source, a micromirror array, and projection optics. The light source illuminates the micromirror array. The micromirror array selectively passes individual light beams that are then projected to a lower build plane 28 (FIG. 2) that is just above the transparent sheet 12. Such projection and micromirror based light engines 26 are known in the art for selective radiative curing of photocurable resins used for 3D printing.

3D printing system 2 includes an upper light engine 30 for selectively curing layers of photocurable liquid 14 onto the upper 3D article 6. In an illustrative embodiment, the upper light engine 30 includes a laser, a scanner, and projection optics. The scanner is a two dimensional scanner such as a series of galvanometer mirrors including an X-mirror and a Y-mirror. A beam of light from the laser passes through the scanner and is focused by the projection optics at an upper build plane 32 (FIG. 2) which has a Z-height corresponding to a top surface of the photocurable liquid 14. The X and Y mirrors laterally scan the beam over the upper build plane 32 along the X and Y axes respectively. In an alternative embodiment, the upper light engine 30 can have a similar construction as light engine 26.

A controller 34 is controllably coupled to the vertical movement mechanism 24, the lower light engine 26, the upper light engine 30, and various other components of printing system 2. The controller includes a processor 36 coupled to an information storage device 38. The information storage device 38 includes a non-volatile or non-transient storage medium storing software instructions. The non-volatile or non-transient storage medium can include one or more of a magnetic disc drive and flash memory. When executed by the processor 36, the software instructions control the vertical movement mechanism 24, the lower light engine 26, the upper light engine 30, and other portions of the 3D printing system. The controller 34 can be a single computer controller co-located with other components of 3D printing system 2. Alternatively, the controller 34 can include multiple computer controllers that can be co-located, separated from, or remote from the other components of system 2.

Figure 2:
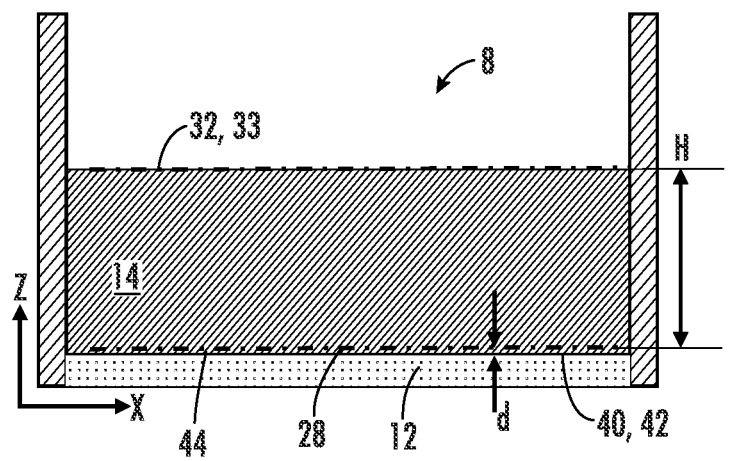
FIG. 2 is a schematic side cutaway view of an embodiment of a build vessel in isolation.

FIG. 2 is a schematic side cutaway view of the build vessel 8 in isolation. The column of photocurable resin 14 has a lower bound or surface 40 at an upper surface 42 of transparent sheet 12. Because the transparent sheet 12 is transmissive to oxygen—an inhibitor—the result is a depletion zone 44 of thickness d within which the radiation from lower light engine 26 cannot cure the photocurable liquid 14. In practice, d has a small magnitude relative to a height of the photocurable liquid column 14. The magnitude of d may be less than one millimeter or less than 0.5 millimeters. In typical systems d is less than 0.25 millimeters or less than 0.1 millimeter. However, that is not always the case, because d is a function of a concentration of photoinitiator in the photocurable fluid 14. This is because a lower concentration of photoinitiator will allow oxygen diffusing through the transparent sheet 12 to affect a greater thickness of photocurable liquid. As a result of the inhibitor, the lower build plane 28 (where the lower light engine 26 can cure the resin) is offset from the lower bound 40 by the distance d.

The column of photocurable resin has an upper bound or upper surface 33 at a gas/liquid interface. The upper surface 33 coincides with the upper build plane 32. For some systems, atmospheric control (e.g., a nitrogen blanket) may be provided at surface 33 to enhance radiation curing at the build plane 32.

A parameter H is defined as a vertical distance between the lower build plane 28 and the upper build plane 32. H is the height of the upper build plane 32 above the lower build plane 28. In various embodiments the magnitude of H is less than 150 millimeters (mm). H can be less than 130 mm or in a range of 10-130 mm. In one embodiment, the upper light engine 30 has projection optics that are configurable to allow a specific value for H that is minimized to just allow the 3D articles 4 and 6 to be fabricated. Minimizing H reduces operational fabrication time and an amount of photocurable liquid 14 required.

Figure 3:
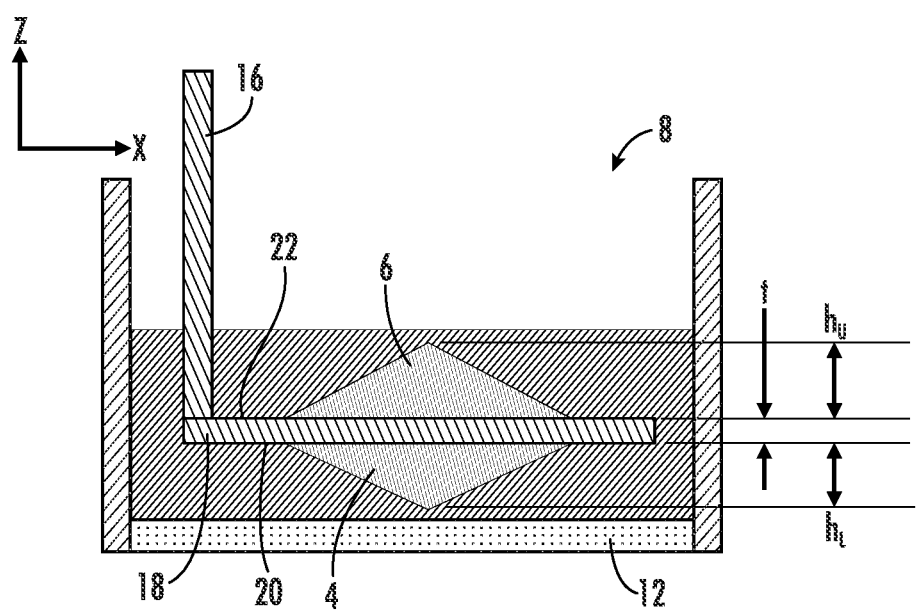
FIG. 3 is a side schematic cutaway view of an embodiment of a build vessel and build platform.

FIG. 3 is a side schematic cutaway view illustrating the build vessel 8 and build platform 16. The build plate 8 has a vertical thickness t. A lower 3D article 4 is formed upon the lower surface 20 of build plate 18. The lower 3D article 4 extends downward from lower surface 20 by a distance $h_L$. An upper 3D article 6 is formed upon the upper surface 22 of build plate 18. The upper 3D article 6 extends upward from upper surface 22 by a distance $h_U$. In the illustrated embodiment, the upper 3D article has a generally converging geometry upward away from the upper build surface 22. In the illustrated embodiment, H is at least equal to the sum $S=t+h_L+h_U$. However, it is desirable to minimize H so as to minimize a translation time of the build plate 18 through the photocurable resin 14. In some embodiments, H is between 1.0 and 2.0 times S. In other embodiments, H is between 1.0 and 1.5 times S. Ideally, H is as close to S as possible while still allowing for "deep dip" coating of resin at the build plane 32 without use of a wiper. Deep dip coating is defined as lowering an upper face (highest point or surface) of upper surface 22 or upper 3D article 6 below the build plane enough to assure resin coating of the upper face and then raising the upper face to the build plane.

Figure 4:
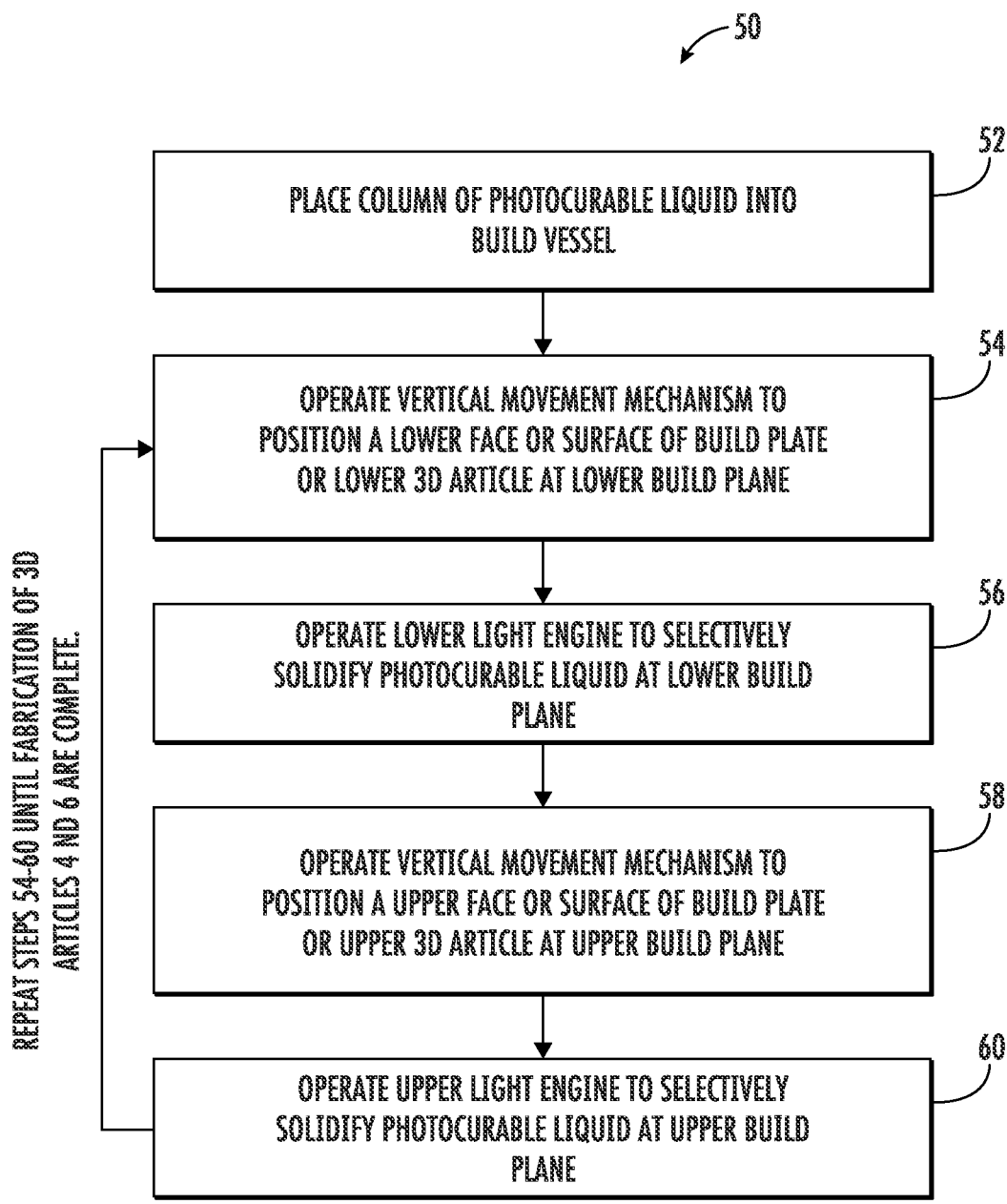
FIG. 4 is a flowchart depicting a method of manufacturing or fabricating a plurality of 3D articles including a lower 3D article and an upper 3D article.

FIG. 4 is a flowchart of a method 50 for manufacturing or fabricating a plurality of 3D articles. According to 52, a column of photocurable liquid 14 is placed into a build vessel 8. The photocurable liquid 14 can be loaded before or after loading the build vessel 8 into the 3D printing system 2. The photocurable liquid 14 accommodates a vertical distance H between a lower build plane 28 and an upper build plane 32. The lower build plane 28 has a geometry defined by the lower light engine 26. More specifically, the Z-position of the lower build plane 28 is determined by a focal length and focus of projection optics of the lower light engine 26. In an illustrative embodiment, the lateral limits in X and Y of the lower build plane 28 is determined by a projected area of pixels (generated by an illuminated micromirror array) and their area projection at the build plane 28. The upper build plane 32 has a lateral geometry defined by the upper light engine 30. The lateral limits in X and Y are determined by limits of a scanner that scans a beam from light engine 30 in X and Y. An upper surface 33 of the column of photocurable liquid 14 is the build plane 32. Projection optics of upper light engine 30 focus a beam from upper light engine 30 upon the build plane 32. In one embodiment, step 52 includes adjusting a focal length of the projection optics to focus the beam upon the build plane 32.

According to 54, controller 34 operates the vertical movement mechanism 24 to position a lower face or surface of the build plate 18 or the lower 3D article 4 at the lower build plane 28. This can include a downward translation of the build plate 18 through the photocurable liquid 14.

According to 56, the controller 34 operates the lower light engine 26 to selectively irradiate and selectively cure a layer of the photocurable liquid 14 at the lower build plane 28. As a result of the prior positioning of step 54, the selectively cured layer accretes onto the lower face or surface of the build plate 18 or the lower 3D article 4 and forms a new lower face.

According to 58, controller 34 operates the vertical movement mechanism to position an upper face or surface of the build plate 18 or the upper 3D article 6 at the upper build plane 32 (or one layer thickness below the build plane 32). According to 60, the controller 34 operates the upper light engine 30 to selectively irradiate and selectively cure a layer of the photocurable liquid at the upper build plane 32. As a result of the prior positioning of step 58, the selectively cured layer accretes onto the upper face or surface of the build plate 18 or the upper 3D article 6 and forms a new upper face.

Steps 54-60 are repeated until fabrication of 3D articles 4 and 6 are complete. As steps 54 and 60 are performed, the build plate 18 is reciprocated up and down within the photocurable liquid 14. The movement magnitude of the reciprocating translations decreases monotonically as the lower 3D article 4 and the upper 3D article 6 are fabricated. The movement downward to selectively cure a layer onto the lower 3D article 4 provides a downward motion of a "deep dip" for the upper face of the upper 3D article 6. In the illustrative embodiment, there is no need for a wiper to coat the upper face of the upper 3D article 6.

The specific embodiments and applications thereof described above are for illustrative purposes only and do not preclude modifications and variations encompassed by the scope of the following claims.

What is claimed:

1. A three-dimensional (3D) printing system comprising:
   a build vessel including a transparent sheet, the build vessel configured to contain a column of photocurable liquid having a lower bound upon the transparent sheet and an upper bound at an interface with a gaseous atmosphere above the column of photocurable liquid;
   a build platform including a build plate having an upper surface and a lower surface;
   a vertical movement mechanism configured to vertically position the upper and lower surfaces of the build plate;
   a lower light engine configured to define a lower build plane above the transparent sheet;
   an upper light engine configured to define an upper build plane at the upper bound of the column of photocurable liquid; and
   a controller configured to operate the vertical movement mechanism, the lower light engine, and the upper light engine to fabricate:
      a lower 3D article upon the lower surface of the build platform by selective solidification of the photocurable liquid at the lower build plane; and
      an upper 3D article upon the upper surface of the build platform by selective solidification of the photocurable liquid at the upper build plane.

2. The three-dimensional (3D) printing system of claim 1 wherein the upper build plane is a vertical distance H above the lower build plane, H is within a range of 10 and 130 millimeters.

3. The three-dimensional (3D) printing system of claim 1, the upper light engine has a variable focal length, a vertical location of the upper build plane is directly related to the variable focal length.

4. The three-dimensional (3D) printing system of claim 1 wherein the lower light engine includes an illuminator lamp that illuminates an array of micromirrors and projection optics that focus light reflected from the array of micromirrors onto the lower build plane.

5. The three-dimensional (3D) printing system of claim 1 wherein the upper light engine includes a laser, scanning optics, and focusing optics, the focusing optics focus a beam from the laser onto the upper build plane, the scanning optics scan the beam across the upper build plane.

6. The three-dimensional (3D) printing system of claim 1 wherein the controller is further configured to:
   operate the vertical movement mechanism to position a lower face of the 3D article at the lower build plane;

operate the lower light engine to selectively solidify the photocurable resin at the lower build plane and onto the lower face;

operate the vertical movement mechanism to position an upper face of the 3D article at an upper build plane; and operate the lower light engine to selectively solidify the photocurable resin at the upper build plane and onto the upper face.

7. The three-dimensional (3D) printing system of claim 1 wherein the upper 3D article has an upwardly converging geometry that facilitates forming a layer of photocurable liquid upon a top face of the upper 3D article without a use of a wiper blade.

8. The three-dimensional (3D) printing system of claim 1 wherein a vertical distance between the upper and lower build planes is H, the build plate has a thickness t, the lower 3D article has a height of $h_L$, the upper 3D article has a height $h_U$, H has a magnitude that is between 1.0 and 2.0 times a sum of $t+h_L+h_U$.

9. The three-dimensional (3D) printing system of claim 1 wherein a vertical distance between the upper and lower build planes is H, the build plate has a thickness t, the lower 3D article has a height of $h_L$, the upper 3D article has a height $h_U$, H has a magnitude that is between 1.0 and 1.5 times a sum of $t+h_L+h_U$.

10. The three-dimensional (3D) printing system of claim 1 wherein a vertical distance between the upper and lower build planes is H, H is less than 130 millimeters.

11. A method of manufacturing the lower 3D article and the upper 3D article using the 3D printing system of claim 1 comprising:

providing a column of photocurable liquid in the build vessel operating the vertical movement mechanism to position a lower face of the build plate or the 3D article at the lower build plane;

operating the lower light engine to selectively solidify a layer of the photocurable resin at the lower build plane;

operating the vertical movement mechanism to position an upper face of the build plate or the 3D article within a layer thickness of the upper build plane; and operating the upper light engine to selectively solidify a layer of the photocurable resin at the upper build plane.

12. The method of claim 11 wherein the lower and upper build planes have vertical locations defined by a focus of the lower and upper light engines respectively.

13. The method of claim 12 wherein the vertical locations of the upper and lower build planes are separated by a vertical distance of magnitude H, the build plate has a thickness t, the lower 3D article has a height of $h_L$, the upper 3D article has a height $h_U$, H has a magnitude that is between 1.0 and 1.5 times a sum of $t+h_L+h_U$.

14. The method of claim 12 wherein the vertical locations of the upper and lower build planes are separated by a vertical distance of magnitude H, H is less than 130 millimeters.

15. The method of claim 11 wherein the build plate is vertically translated in an oscillatory manner between selectively curing resin at the upper and lower build planes, the oscillatory motion is monotonically decreasing during a process of fabricating the upper and lower 3D articles.

16. A method of manufacturing a lower 3D article and an upper 3D article comprising:

providing a build vessel including a transparent sheet at a lower side;

filling the build vessel with a column of photocurable liquid having a lower bound at the transparent sheet and an upper bound at a liquid to air interface;

reciprocally translating a build plate between two vertical positions within the photocurable liquid including:
  a lower position at which a lower face of the build plate or 3D article is positioned at a lower build plane within one millimeter of the transparent sheet; and
  an upper position at which an upper face of the build plate or 3D article is positioned within a layer thickness of an upper build plane at the upper bound of the column;

movement of reciprocal translations monotonically decreasing as the lower 3D article and the upper 3D article are being fabricated;

operating a lower light engine to selectively cure a layer of the photocurable resin at the lower build plane when the lower face is at the lower build plane; and operating an upper light engine to selectively cure a layer of photocurable resin at the upper build plane when the upper face is at the upper build plane.

17. The method of claim 16 wherein the column of photocurable liquid has a vertical height of less than 130 millimeters.

18. The method of claim 16 wherein operating the lower light engine includes operating a light source that illuminates a micromirror array, operating the micromirror array to selectively reflect individual beams of light into projection optics.

19. The method of claim 18 further including the projection optics focusing the individual beams onto the lower build plane.

20. The method of claim 16 further including operating a laser to generate a beam and operating scanning optics to scan the beam across the upper build plane.

* * * * *